(12) United States Patent
Tsuchiya et al.

(10) Patent No.: US 8,243,365 B2
(45) Date of Patent: Aug. 14, 2012

(54) MICROSCOPE

(75) Inventors: Atsuhiro Tsuchiya, Hachioji (JP); Keisuke Tamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 133 days.

(21) Appl. No.: 12/542,219

(22) Filed: Aug. 17, 2009

(65) Prior Publication Data

US 2010/0053744 A1 Mar. 4, 2010

(30) Foreign Application Priority Data

Aug. 27, 2008 (JP) .................................. 2008-218712

(51) Int. Cl.
*G02B 21/06* (2006.01)

(52) U.S. Cl. .......................... 359/390; 359/368; 359/385

(58) Field of Classification Search .......... 359/385–390, 359/368

See application file for complete search history.

(56) References Cited

U.S. PATENT DOCUMENTS

| | | | | |
|---|---|---|---|---|
| 1,960,554 A | * | 5/1934 | Siedentopf | 359/390 |
| 2,289,575 A | * | 7/1942 | Critoph et al. | 362/419 |
| 2,329,897 A | * | 9/1943 | Heinicke | 359/390 |
| 3,798,435 A | * | 3/1974 | Schindl | 362/232 |
| 4,284,327 A | * | 8/1981 | Kraft et al. | 359/388 |
| 6,038,064 A | * | 3/2000 | Kanao et al. | 359/355 |
| 6,304,375 B1 | * | 10/2001 | Furuhashi | 359/385 |
| 7,286,286 B2 | * | 10/2007 | Obuchi | 359/385 |

FOREIGN PATENT DOCUMENTS

| | | | | |
|---|---|---|---|---|
| JP | 2003-215461 | * | 7/2003 | 359/390 |
| JP | 2007-148364 A | | 6/2007 | |

* cited by examiner

*Primary Examiner* — Thong Nguyen
(74) *Attorney, Agent, or Firm* — Holtz, Holtz, Goodman & Chick, PC

(57) ABSTRACT

A microscope includes a main body, a transmitted light source, and a transmitted-light illumination optical system. The main body has a substantially C-shape when viewed from side, and is composed of a lower horizontal portion, an upper horizontal portion, and a brace portion. The brace portion connects between the lower horizontal portion and the upper horizontal portion on their rear side. The transmitted-light illumination optical system brings an illumination light from the transmitted light source to a specimen supported by the main body, and illuminates the specimen with the illumination light transmitted therethrough. The transmitted-light illumination optical system and the transmitted light source are removably attached to the lower horizontal portion of the main body.

7 Claims, 18 Drawing Sheets

MICROSCOPE

CROSS-REFERENCE TO RELATED APPLICATIONS

This application is based upon and claims the benefit of priority from Japanese Patent Application No. 2008-218712, filed on Aug. 27, 2008, the entire contents of which are incorporated herein by reference.

BACKGROUND OF THE INVENTION

1. Field of the Invention

The present invention relates to a microscope including a transmitted-light illumination optical system for illuminating a specimen with transmitted light and a transmitted light source.

2. Description of the Related Art

As a typical microscope, an upright microscope including a transmitted-light illumination optical system and a transmitted light source, as disclosed in Japanese Patent Application Laid-open No. 2007-148364, is well-known. Such an upright microscope can be classified, for example, into five types as shown in FIGS. 11 to 15 (conventional examples 1 to 5). Microscopes according to the conventional examples 1 to 5 are described below with reference to FIGS. 11 to 15.

First, a configuration and a mechanism of the microscope according to the conventional example 1 are explained below with reference to FIG. 11.

As shown in FIG. 11, a main body 30 of the microscope according to the conventional example 1 has a C-shape when viewed from the side. The main body 30 is composed of a frame 18 and an arm 17. The frame 18 has an L-shape when viewed from the side. On the rear side (the left side in FIG. 11) of a base portion 18a of the frame 18, a halogen light source 1 as the transmitted light source is arranged.

An illumination light emitted from the halogen light source 1 enters a collector lens 3 contained in the base portion 18a of the frame 18, and is transformed into substantially parallel light by the collector lens 3, aid then illuminated onto a specimen 10 via a field stop (FS) 6, a mirror 7, a window lens 8, and a condenser lens 9. Specifically, the illumination light, which is transformed into the substantially parallel light by the collector lens 3, is collected on an aperture stop (AS) 9b by the window lens 8 and a first lens group 9a of the condenser lens 9, and uniformly illuminated onto the whole specimen 10 via a second lens group 9c of the condenser lens 9. The contrast of an image of the specimen 10 can be changed by changing an aperture diameter of the AS 9b.

Furthermore, the illumination light passing through the FS 6 is transformed into substantially parallel light by the window lens 8 via the mirror 7, and collected on a plane of the specimen 10 (hereinafter, "the specimen plane") by the condenser lens 9, and also an intermediate image of the FS 6 (hereinafter, "the FS image") is projected onto the specimen plane. An illuminated region on the specimen plane (i.e., a field of view) can be changed by changing an aperture diameter of the FS 6.

The condenser lens 9 is removably held on a condenser holder 21 with a well-known means such as a circular dovetail (not shown). By rotation of a condenser handle 22, the condenser holder 21 is moved up and down, and thus the condenser lens 9 is moved up and down with respect to a stage holder 20 along with the condenser holder 21. The specimen 10 is put on a stage 19 held on the stage holder 20. Therefore, by moving the condenser lens 9 up and down, the FS image can be projected onto the specimen plane precisely.

A configuration of the halogen light source 1 is briefly explained below. The halogen light source 1 is contained in a lamp house 2. The lamp house 2 is removably held on the frame 18 of the main body 30 via a pin 2a. Incidentally, a power source 4 of the halogen light source 1 is contained in the frame 18, and capable of being electrically connected to the halogen light source 1 via the pin 2a. Furthermore, the collector lens 3, the FS 6, the mirror 7, and the window lens 8 are contained in the base portion 18a of the frame 18.

Subsequently, a basic configuration of an observation system of the microscope according to the conventional example 1 is explained below.

As shown in FIG. 11, the illumination light transmitted through the condenser lens 9 passes through the specimen 10, and is transformed into parallel light by an objective lens 11, and then focused into a specimen image by an imaging lens 14 provided in a tube 13 via a prism 15 and other prisms (not shown), whereby an observer can make a visual observation of the specimen image through an eyepiece lens 16. A plurality of the objective lenses 11 can be attached to a revolver 12 that is removably-held on the arm 17 of the main body 30. By rotation of the revolver 12, any of the objective lenses 11 having a desired magnification can be set on an optical path, so that an observer can make a visual observation of the specimen image at the desired magnification.

Subsequently, basic configurations of the focusing system and the stage of the microscope according to the conventional example 1 are explained below.

As shown in FIG. 11, the stage 19 is removably held on the stage holder 20. The stage holder 20 is removably held on a movable guide 23 capable of moving up and down. By rotation of a focusing handle 5, the movable guide 23 can be moved up and down with a well-known means such as a gear (not shown) or a rack and pinion (not shown). By the up-and-down movement of the movable guide 23, the specimen 10 put on the stage 19 can be moved up and down with respect to the objective lens 11 so as to adjust the focus.

When the specimen 10 is moved up and down by the rotation of the focusing handle 5, the condenser lens 9 is also moved up and down together with the specimen 10. On the other hand, the illumination light transmitted through the FS 6 is transformed into the parallel light by the window lens 8. Therefore, when the specimen 10 does riot greatly vary in thickness, it is not necessary to move the condenser lens 9 up and down anew by rotation of the condenser handle 22 to project the FS image onto the specimen plane.

Furthermore, the stage 19 on which the specimen 10 is put can be moved in an X direction (a direction perpendicular to the plane of the drawing in FIG. 11) and a Y direction (a horizontal direction in FIG. 11) by rotation of a stage handle (not shown). Therefore, an observer can find a desired observation point of the specimen 10 by rotating the stage handle.

With the microscope having the above configuration, an observer puts the specimen 10 on top of the stage 19, and focuses on the specimen 10 by rotating the focusing handle 5, and then finds a desired observation point of the specimen 10 by rotating the stage handle. Thus, the observer can make a visual observation of the specimen 10 at the desired observation point through the eyepiece lens 16.

Subsequently, a configuration and a mechanism of the microscope according to the conventional example 2 are explained with reference to FIG. 12.

The microscope according to the conventional example 2 is different from the microscope according to the conventional example 1 in that a filter is provided on the optical path of the illumination light. Except for this point, the description of the portions identical to those of the conventional example 1 is omitted.

As shown in FIG. 12, two filters 24 are removably inserted between the collector lens 3 and the FS 6 on the optical path of the illumination light. As the filters 24, for example, a color conversion filter and a neutral density filter are mainly used. The color conversion filter is used to increase a color temperature of a halogen lamp (not shown) thereby converting the color from reddish color into daylight color. The neutral density filter is used to adjust the brightness. Although the brightness can be adjusted by changing the voltage of the halogen lamp, if the voltage is changed, the temperature color is also changed. Therefore, the neutral density filter having uniform spectral transmission characteristics is generally used because there is no change in color temperature.

Subsequently, a configuration and a mechanism of the microscope according to the conventional example 3 are explained with reference to FIG. 13.

The microscope according to the conventional example 3 is different from the microscope according to the conventional example 1 in that a light-emitting diode (LED) light source 25 is included instead of the halogen light source 1. With the change of the light source, the power source for the light source is also changed to a power source 26 for the LED light source. Except for this point, the description of the portions identical to those of the conventional example 1 is omitted.

As described in the conventional example 2, when a halogen light source is used as the light source, it is necessary to provide a color conversion filter and a neutral density filter. However, in the microscope according to the conventional example 3, the LED light source 25 including an LED capable of emitting a light in daylight color is used. Therefore, it is not necessary to provide the color conversion filter. Furthermore, even when the voltage or the current of the LED is changed, there is little or no change in color temperature. Therefore, it is not necessary to provide the neutral density filter. In the conventional example 1, such filters are not provided even though the microscope employs the halogen light source. In a case where the color does not matter, it is not necessary to provide the filters, and thus it is possible to provide the microscope at a low cost.

Subsequently, a configuration and a mechanism of the microscope according to the conventional example 4 are explained with reference to FIG. 14.

The microscope according to the conventional example 4 is different from the microscope according to the conventional example 1 in that it is configured that the specimen plane is located at a lower position than that is in the conventional example 1. Except for this point, the description of the portions identical to those of the conventional example 1 is omitted.

As shown in FIG. 14, in the conventional example 4, a thickness of the stage holder 20 in a vertical direction is smaller than that is in the conventional example 1. Therefore, the stage holder 20 can be attached to the lower part of the movable guide 23. Thus, the specimen 10 comes down to a lower position. The stage 19 has the same thickness as that is in the conventional example 1.

Furthermore, in the conventional example 4, the condenser lens 9 also comes down to a lower position along with the stage holder 20. Therefore, in case of causing the first lens group 9a to interfere with the base portion 18a of the frame 18, the first lens group 9a is contained in the base portion 18a. With this, the window lens 8 and the FS 6 are shifted to the side of the halogen light source 1. By such a configuration, a position of the stage 19 on which the specimen 10 is put can be lowered. Thus, a room under the arm 17 gets larger than that is in the conventional example 1, so that replacement of the specimen 10 can be performed easily.

Subsequently, a configuration and a mechanism of the microscope according to the conventional example 5 are explained with reference to FIG. 15.

The microscope according to the conventional example 5 is different from the microscope according to the conventional example 1 in that a transmitted-light illumination optical system is configured to make an optical path straight without a mirror in place of the optical folding path with a mirror, and in that the LED light source is used as the transmitted light source instead of the halogen light source. Except for this point, the description of the portions identical to those of the conventional example 1 is omitted.

As shown in FIG. 15, the microscope according to the conventional example 5 includes the LED light source 25 instead of the halogen light source 1. With the change of the light source, the power source for the light source is also changed from the power source 4 for the halogen light source to the power source 26 for the LED light source. The LED light source 25 is arranged right below an observation optical axis. The illumination light emitted from the LED light source 25 is transformed into substantially parallel light by the collector lens 3, and collected on the AS 9b by the first lens group 9a via the FS 6, and focused into a light source image of the LED light source 25. In addition, the microscope according to the conventional example 5 does not include the window lens 8, and differs from the microscope according to the conventional example 1 in this point.

Furthermore, the illumination light passing through the FS 6 is collected on the specimen plane via the condenser lens 9, and an FS image is projected onto the specimen plane. Until the illumination light passing through the FS 6 enters the first lens group 9a, the illumination light is riot parallel light unlike in the conventional example 1. Therefore, if the illumination light is not focused on the specimen 10, the FS image is defocused significantly. The microscope according to the conventional example 5 is inferior in illumination performance as compared with the mirror folding type of microscope according to the conventional example 1. However, the microscope according to the conventional example 5 does not require the mirror 7 and the window lens 8, so that the production cost can be reduced. In addition, the LED light source 25 is arranged right below the observation optical axis, so that replacement of the LED light source 25 is relatively simple.

SUMMARY OF THE INVENTION

A microscope according to an aspect of the present invention includes a main body that has a substantially C-shape when viewed from side, and is composed of a lower horizontal portion, an upper horizontal portion, and a brace portion, the brace portion connecting between the lower horizontal portion and the upper horizontal portion at their rear side; a transmitted light source; and a transmitted-light illumination optical system that brings illumination light from the transmitted light source to a specimen supported by the main body, and illuminates the specimen with the illumination light transmitted therethrough. The transmitted-light illumination optical system and the transmitted light source are removably attached to the lower horizontal portion of the main body.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
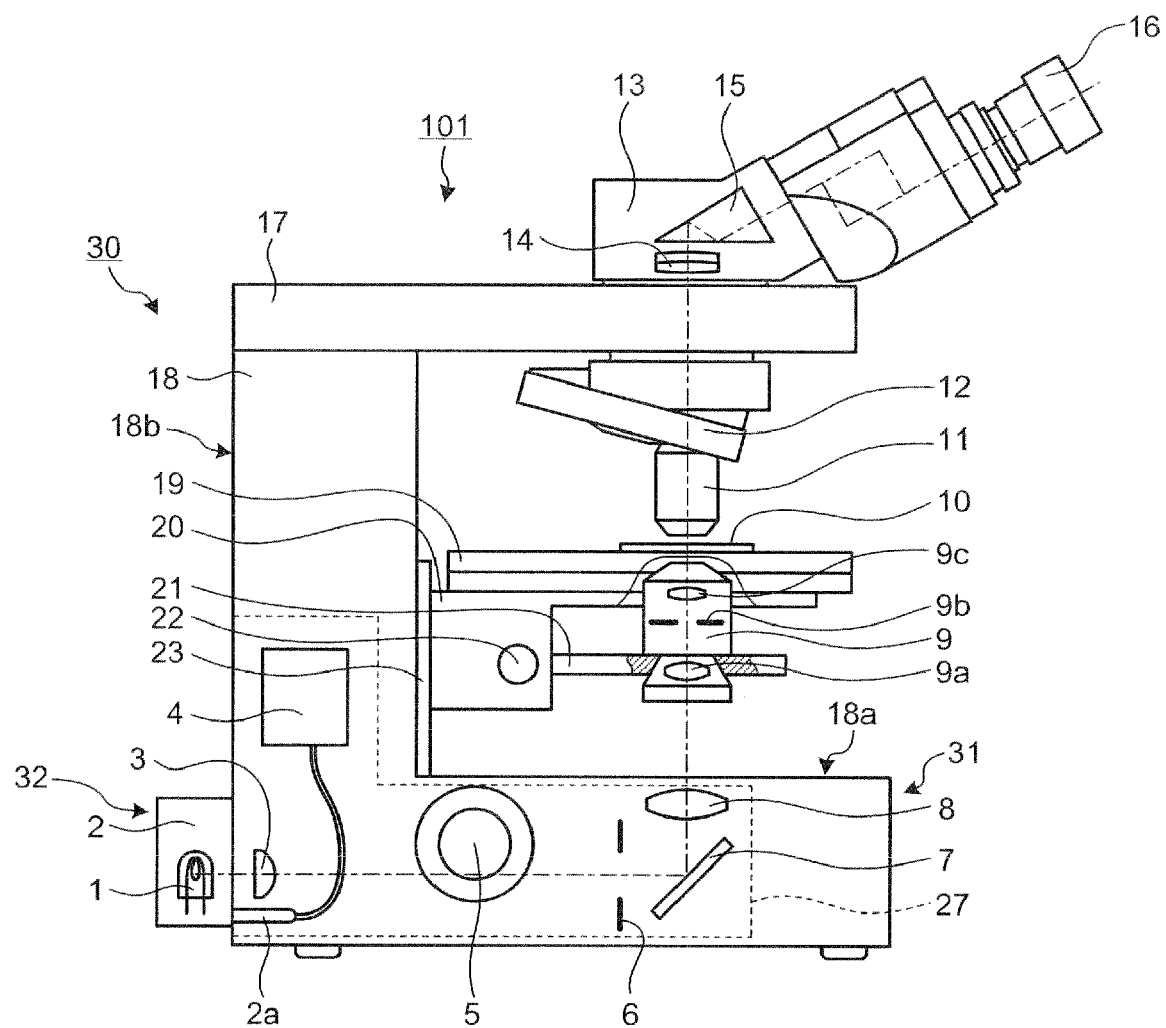
FIG. 1 is a schematic sectional side view of an example of a microscope according to a first embodiment of the present invention.

Exemplary embodiments of a microscope according to the present invention are explained in detail below with reference to the accompanying drawings.

Microscopes 101 to 105 as examples of a microscope according to a first embodiment of the present invention are explained below with reference to FIGS. 1 to 5. The examples of the microscope according the first embodiment shown in FIGS. 1 to 5 are respectively associated with the conventional examples 1 to 5 shown in FIGS. 11 to 15. The portions identical to those in the conventional examples 1 to 5 are denoted with the same reference numerals.

As shown in FIGS. 1 to 5, the main body 30 of each of the microscopes 101 to 105 has a C-shape when viewed from the side. The main body 30 is composed of the frame 18 and the arm 17. The frame 18 has an L-shape when viewed from the side. The arm 17 is provided on top of the frame 18, and composes an upper horizontal portion of the main body 30. The frame 18 is composed of the base portion 18a as a lower horizontal portion of the main body 30 and a brace portion 18b. The brace portion 18b connects the base portion 18a to the arm 17 at their rear sides 32.

The main body 30 includes, as the transmitted-light illumination optical system, a transmitted-light illumination unit 27 surrounded with a dotted frame. The transmitted-light illumination unit 27 is contained in the base portion 18a of the frame 18. The transmitted-light illumination unit 27 is removably held on the frame 18 located on the far side with respect to an observer, i.e., on the rear side 32 of the base portion 18a in an integrated manner.

Specifically, the transmitted-light illumination unit 27 can be removably held on the rear side 32 of the base portion 18a by a well-known means (not shown), for example, by three-sided butting and screw fixation, or fit with an anti-rotation pin and butting.

Figure 16A:
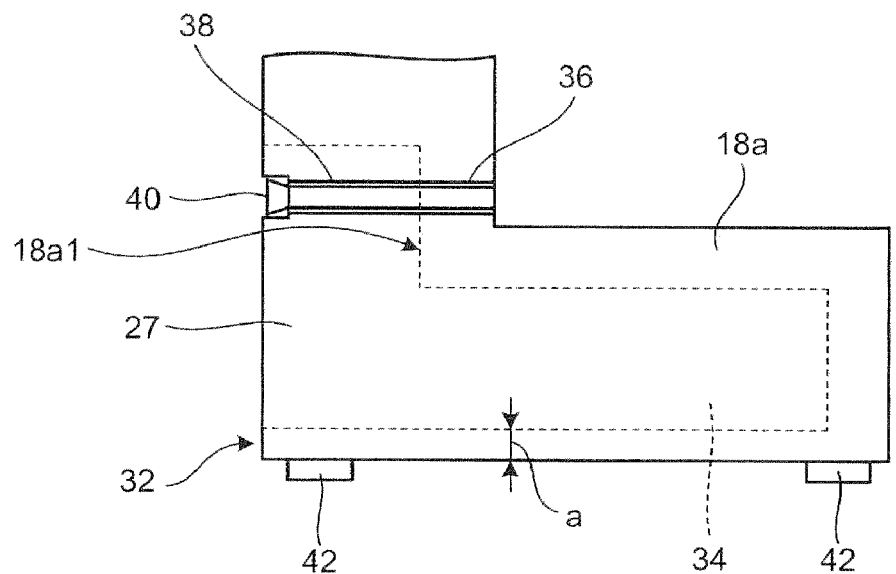
FIG. 16A is a schematic sectional side view showing a removable configuration of The microscope according to the first embodiment of the present invention.
Figure 16B:
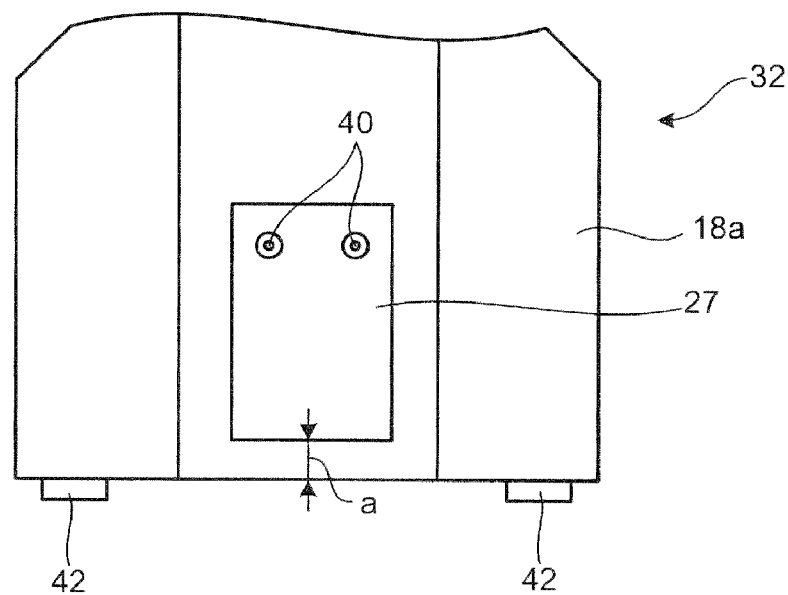
FIG. 16B is a schematic rear view showing the removable configuration of the microscope according to the first embodiment of the present invention.

For example, as shown in FIGS. 16A and 16B, a case where a concave portion 34 having a substantially L-shape when viewed from the side is formed on the rear side 32 of the base portion 18a so that the transmitted-light illumination unit 27 is removably mounted in the concave portion 34, is explained. In this case, two screw holes 36 are formed on the right and left sides of an upper butting side 18a1 of the base portion 18a. Meanwhile, two screw holes 38, horizontally-penetrating through the transmitted-light illumination unit 27 with respect to a front-back direction, are formed on an upper part of the transmitted-light illumination unit 27 so as to correspond to the screw holes 36, respectively. The transmitted-light illumination unit 27 is inserted into the concave portion 34, and an edge face of the transmitted-light illumination unit 27 is brought into contact with the upper butting side 18a1 of the base portion 18a. Fixation screws 40 are inserted into the screw holes 38 on the transmitted-light illumination unit 27, and driven in the screw holes 36 on the base portion 18a. By this, the transmitted-light illumination unit 27 can he fixed on the concave portion 34 of the base portion 18a. The concave portion 34 is formed on the base portion 18a so that a thickness "a" is left on a lower end portion of the base portion 18a, and rubber feet 42 are attached to the four corners of a bottom surface of the base portion 18a, so that the force acting on a thin and relatively low-strength portion corresponding to the thickness "a" on the center side of the bottom surface of the base portion 18a is reduced.

In the microscope 101 shown in FIG. 1, the transmitted-light illumination unit 27 includes the collector lens 3, the FS 6, the mirror 7, the window lens 8, the power source 4 for the halogen light source, and the pin 2a. In the microscope 102 shown in FIG. 2, the transmitted-light illumination unit 27 further includes the filters 24 in addition to the collector lens 3, the FS 6, the mirror 7, the window lens 8, the power source 4 for the halogen light source, and the pin 2a. In the microscope 103 shown in FIG. 3, the transmitted-light illumination unit 27 includes the collector lens 3, the FS 6, the mirror 7, the window lens 8, the power source 26 for the LED light source, and the pin 2a. In the microscope 104 shown in FIG. 4, the transmitted-light illumination unit 27 includes the collector lens 3, the FS 6, the window lens 8, the mirror 7, the first lens group 9a, the power source 4 for the halogen light source, and the pin 2a. In the microscope 105 shown in FIG. 5, the transmitted-light illumination unit 27 includes the collector lens 3, the FS 6, the LED light source 25, and the power source 26 for the LED light source.

Each of the lamp houses 2 shown in FIGS. 1 to 5 is removably held on the transmitted-light illumination unit 27 so as to make electrical connection and disconnection between the light source contained in the lamp house 2 and the power source outside of the lamp house 2. The five types of the transmitted-light illumination units 27 shown in FIGS. 1 to 5 are interchangeable with one another. Furthermore, the two types of the lamp houses 2 containing therein either the halogen light source or the LED light source are interchangeable with each other depending on which one of the transmitted-light illumination units 27 shown in FIGS. 1 to 5 is combined with the lamp house 2.

Although it is not illustrated in the drawing, when both the power source 4 for the halogen light source and the power source 26 for the LED light source can be used as the power source for the other light source, i.e., as the power source for both the halogen light source and the LED light source, the halogen light source 1 and the LED light source 25 can be easily changed to the other light source just by replacing the lamp house 2 to the corresponding type of the lamp house.

Furthermore, although it is not illustrated in the drawing, when both the power source 4 for the halogen light source and the power source 26 for the LED light source can be used as the power source for the other light source, or when the power source 4 for the halogen light source and the power source 26 for the LED light source are assumed to be used as the power source for the same type of the light source, the power source shall not be included in the transmitted-light illumination unit 27. In this case, the power source can be non-removably contained in the frame 18.

As shown by the transmitted-light illumination units 27, various types of transmitted-light illumination units that types, combinations, and layouts of elements included therein are different from one another can be used. For example, some of the elements included in the transmitted-light illumination units 27 shown in FIG. 1 to 5, such as the mirror, can be displaced, or layouts of the elements can be changed.

Figure 2:
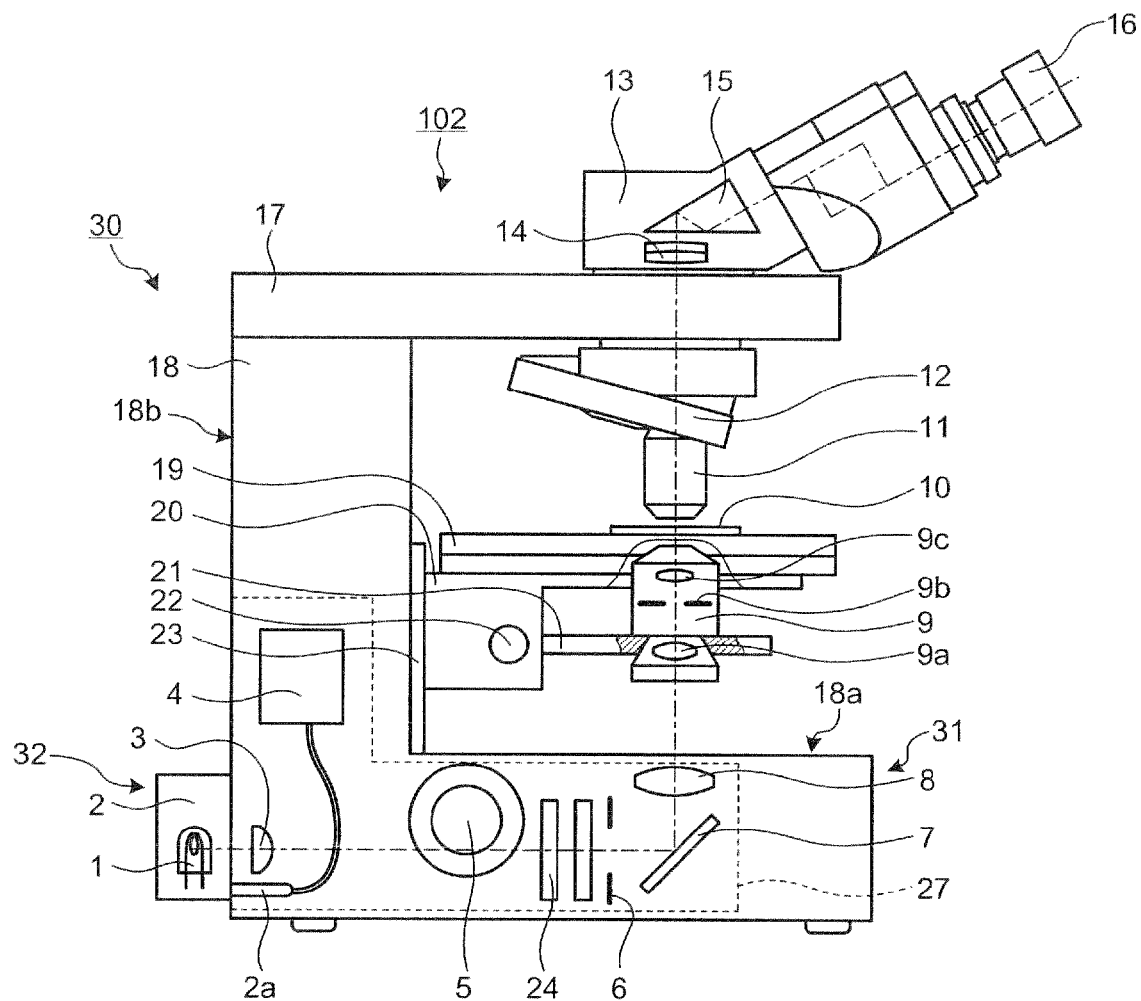
FIG. 2 is a schematic sectional side view of another example of the microscope according to the first embodiment of the present invention.
Figure 3:
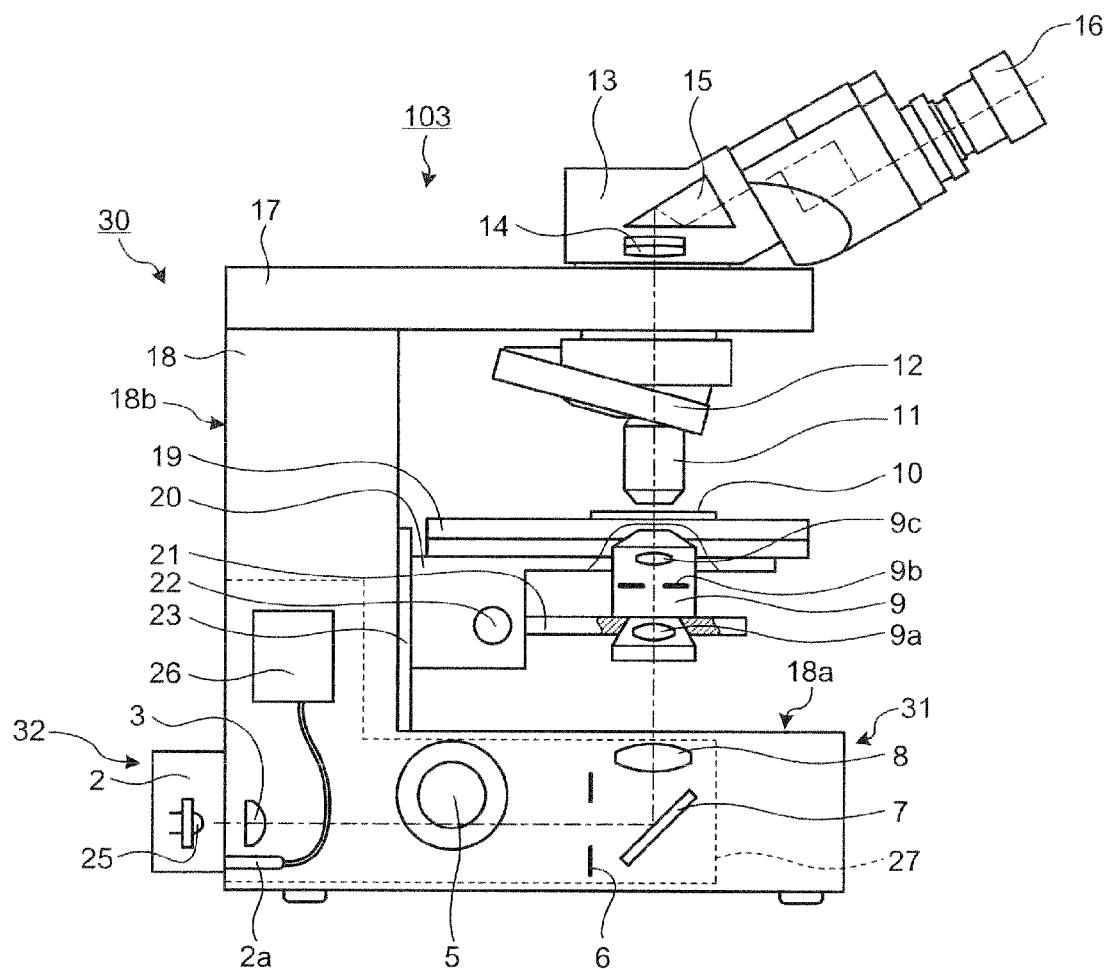
FIG. 3 is a schematic sectional side view of still another example of the microscope according to the first embodiment of the present invention.
Figure 4:
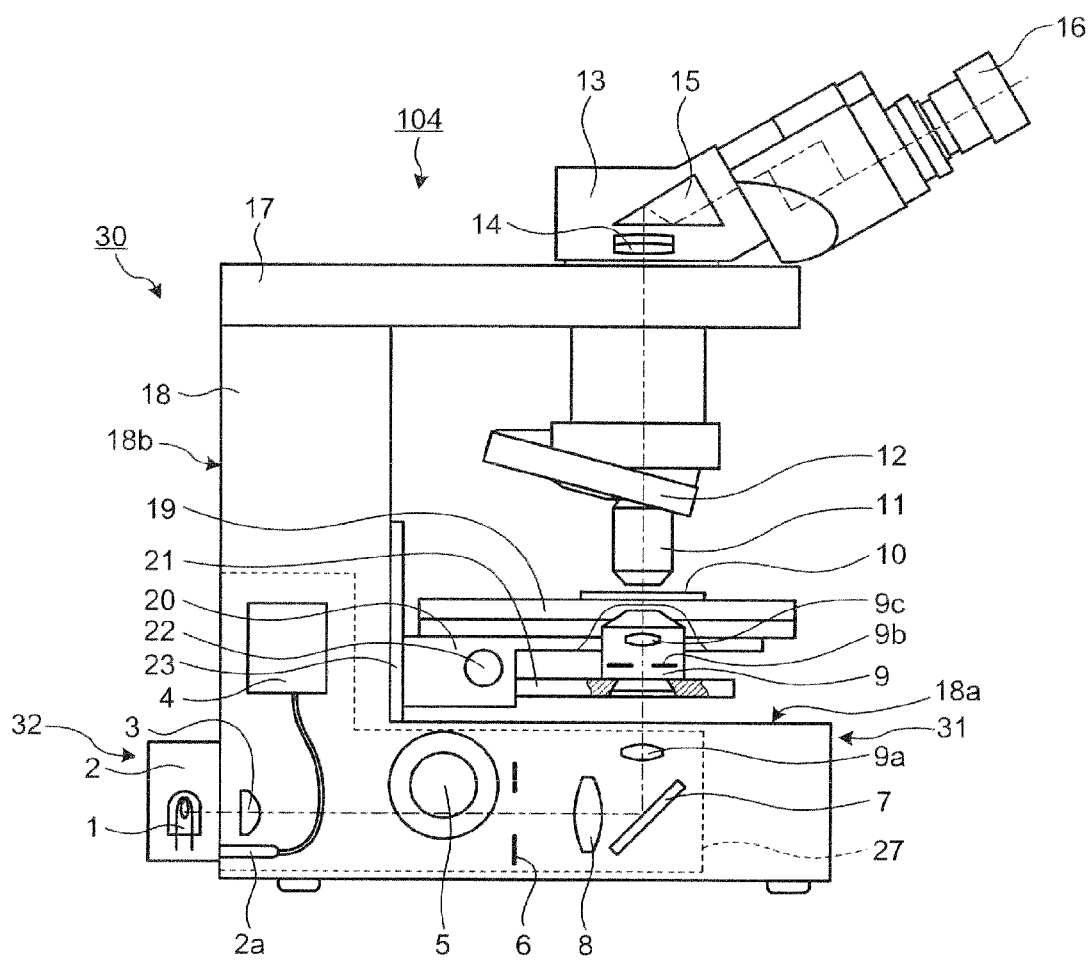
FIG. 4 is a schematic sectional side view of still another example of the microscope according to the first embodiment of the present invention.
Figure 5:
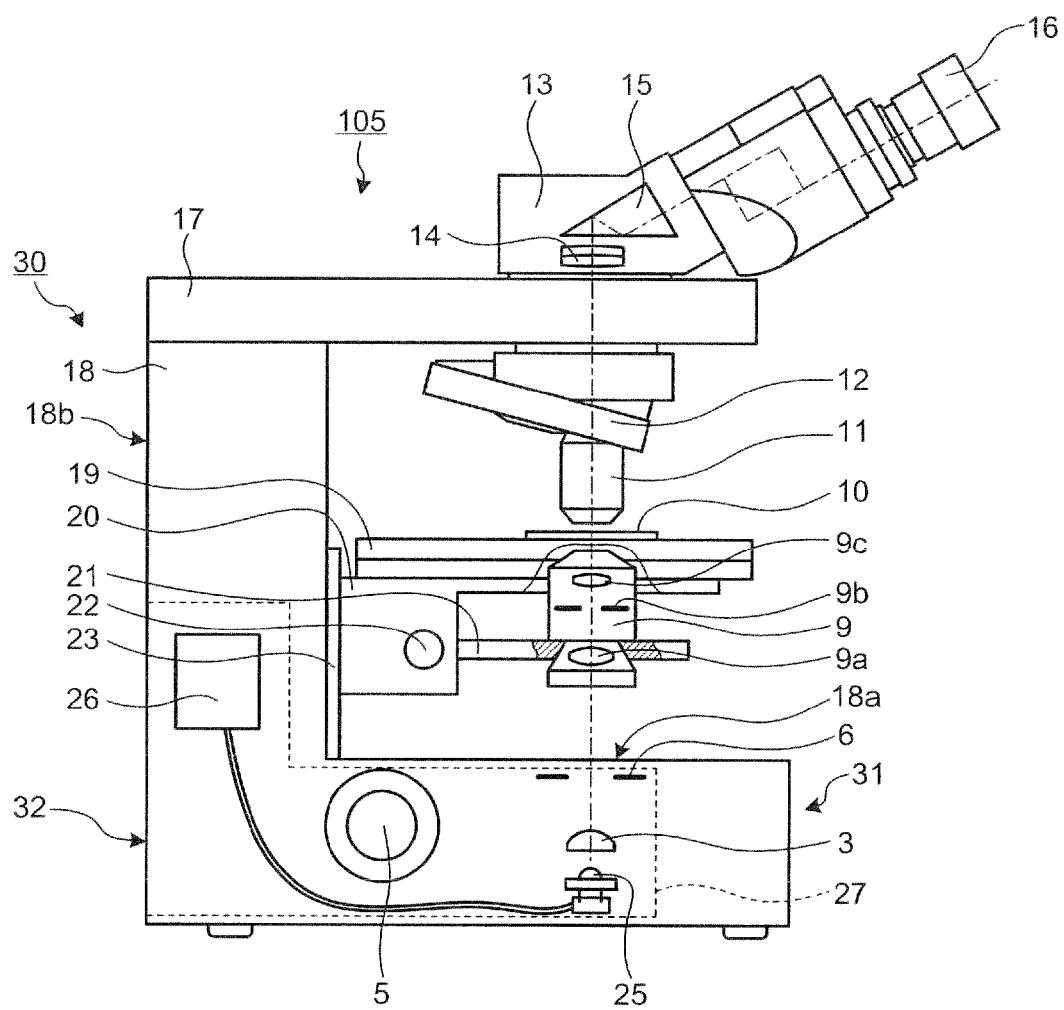
FIG. 5 is a schematic sectional side view of still another example of the microscope according to the first embodiment of the present invention.

In the first embodiment, the transmitted-light illumination unit 27 of the microscope 102 shown in FIG. 2 is configured that the filters 24 can be manually inserted into and removed from the optical path in the transmitted-light illumination optical system. Alternatively, it can be configured that each of the filters 24 is electrically-driven to be inserted into and removed from the optical path, for example, by switch operation performed by a user.

In this manner, in the first embodiment, with respect to one type of the main body 30, any of the transmitted-light illumination units 27 and any of the lamp houses 2 can be interchangeably used among the microscopes 101 to 105. Therefore, by replacing the transmitted-light illumination unit 27 and the lamp house 2 with other types, the transmitted-light illumination optical system and the transmitted light source can be easily changed to different types. Thus, a user can select desired types of the transmitted-light illumination optical system and the transmitted light source. Furthermore, in the production of the microscopes, it is only necessary to produce at least one type of the main body. Therefore, it is possible to facilitate the production management and the inventory management, and it is also possible to reduce the production cost.

Subsequently, microscopes 201 to 203 as examples of a microscope according a second embodiment of the present invention are explained below with reference to FIGS. 6 to 8.

Figure 6:
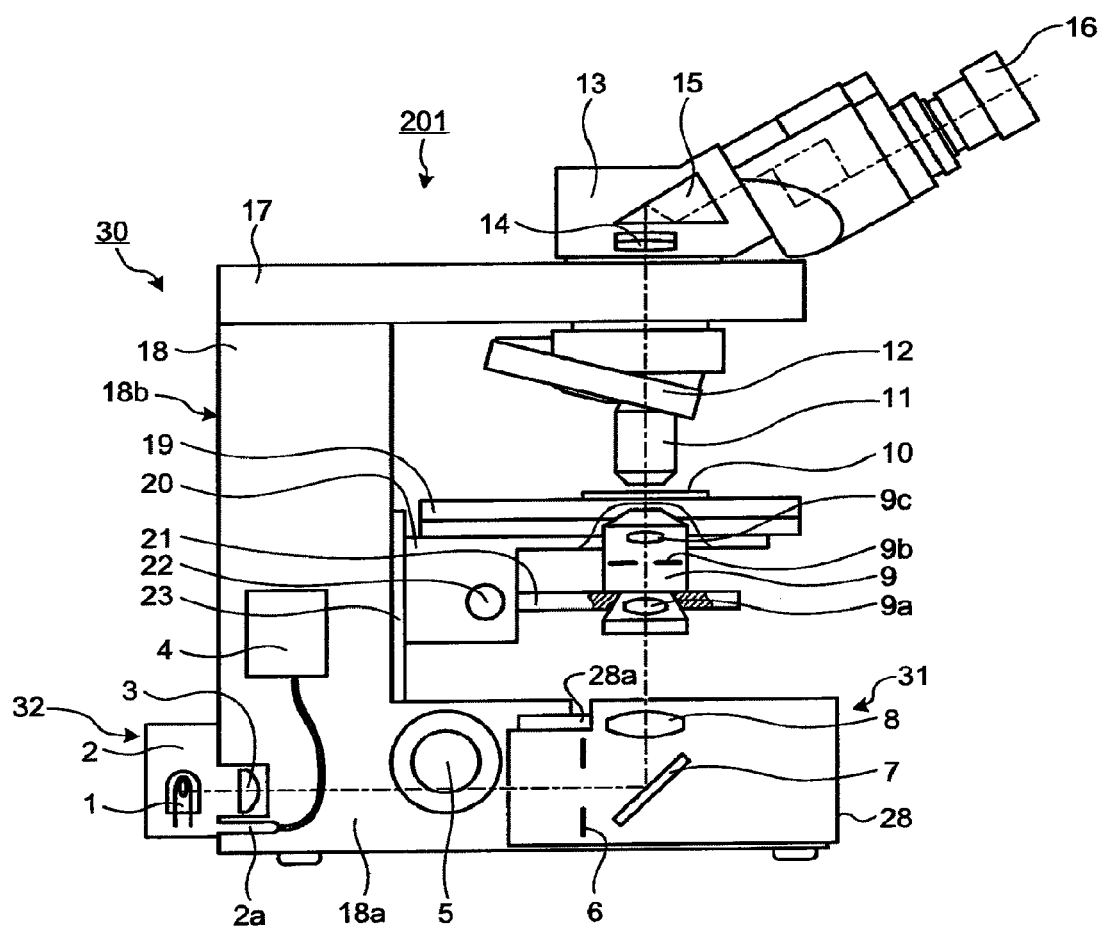
FIG. 6 is a schematic sectional side view of an example of a microscope according to a second embodiment of the present invention.
Figure 7:
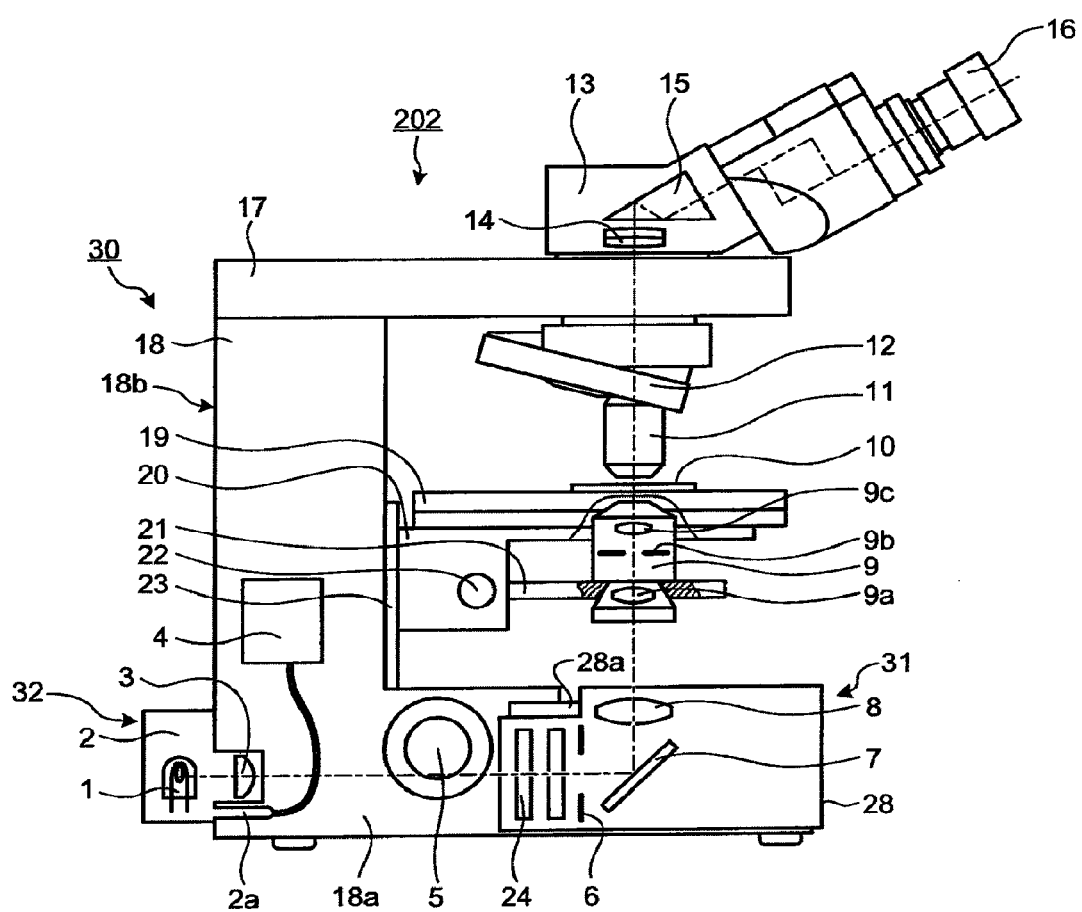
FIG. 7 is a schematic sectional side view of another example of the microscope according to the second embodiment of the present invention.
Figure 8:
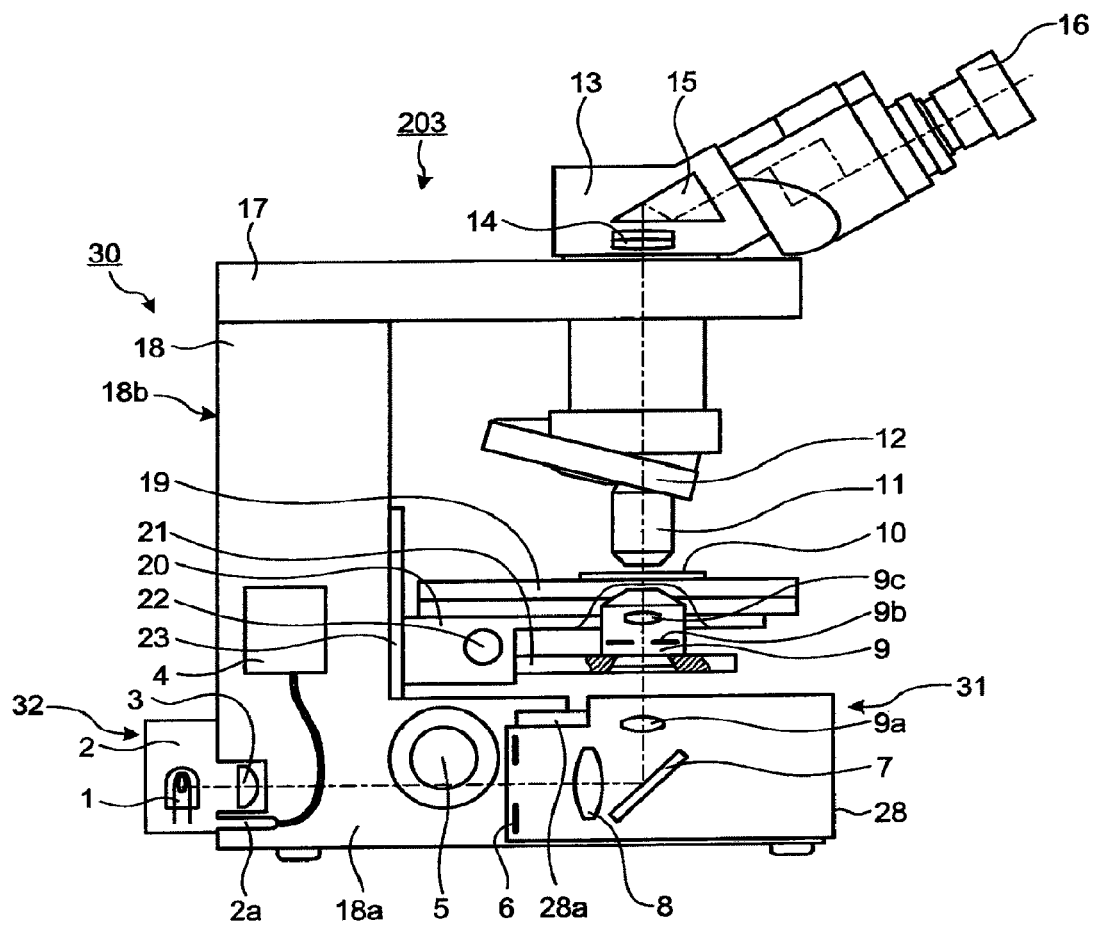
FIG. 8 is a schematic sectional side view of still another example of the microscope according to the second embodiment of the present invention.
Figure 14:
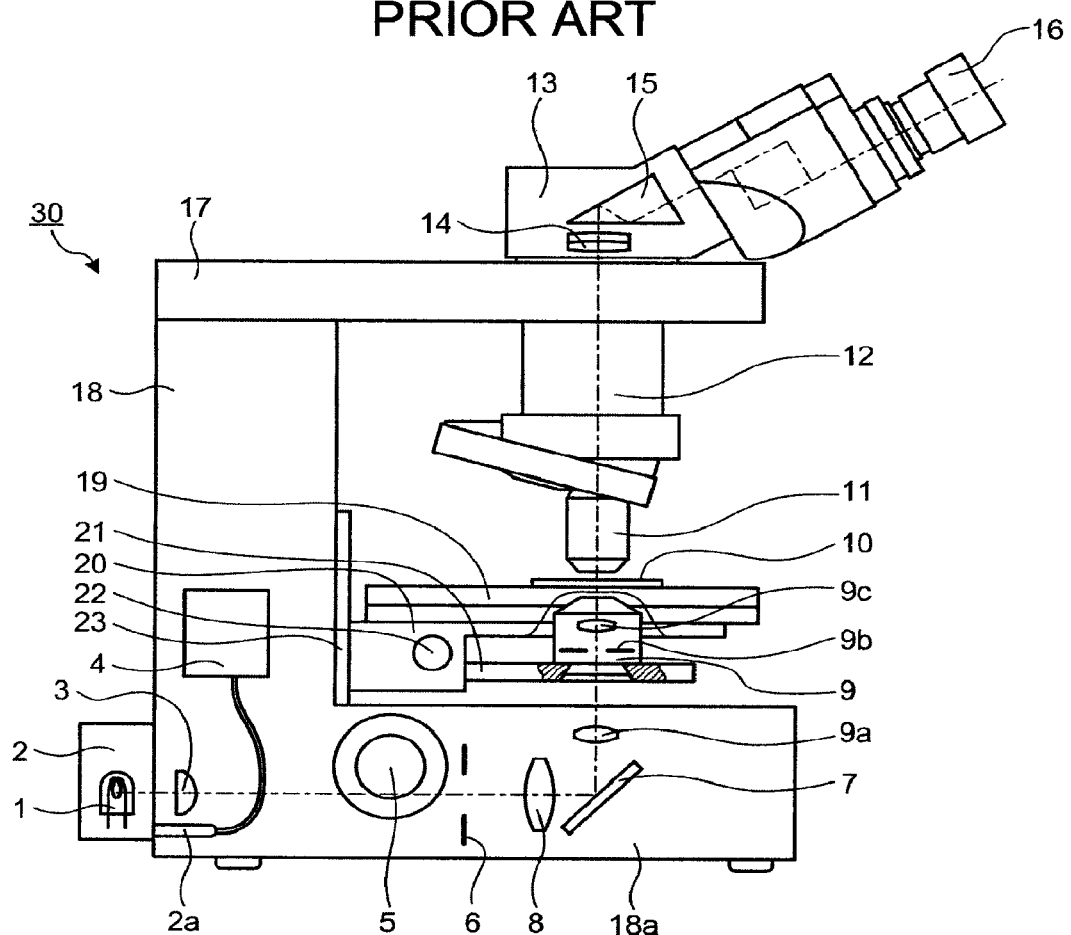
FIG. 14 is a schematic sectional side view of an example of a microscope according to a conventional example 4.

The microscope 201 shown in FIG. 6 is associated with the conventional example 1 (see FIG. 11), the microscope 202 shown in FIG. 7 is associated with the conventional example 2 (see FIG. 12), and the microscope 203 shown in FIG. 8 is associated with the conventional example 4 (see FIG. 14). The portions identical to those in the conventional examples 1, 2, and 4 are denoted with the same reference numerals.

As shown in FIGS. 6 to 8, in the microscopes 201 to 203 according the second embodiment, a transmitted-light illumination unit 28 as the transmitted-light illumination optical system is contained in the base portion 18a of the frame 18. The transmitted-light illumination unit 28 is removably held on the frame 18 located on the near side with respect to an observer, i.e., on a front side 31 of the base portion 18a in an integrated manner. Specifically, as shown in FIGS. 6 to 8, the transmitted-light illumination unit 28 is removably held on the front side 31 of the base portion 18a by a means of a sliding dovetail 28a. The transmitted-light illumination unit 28 slides on the sliding dovetail 28a in a front-back direction from the front side 31, and is attached to and detached from the base portion 18a. Alternatively, the transmitted-light illumination unit 28 can be removably held on the front side 31 of the base portion 18a by a well-known means (not shown), for example, by three-sided butting and screw fixation, or fit with an anti-rotation pin and butting.

Figure 17A:
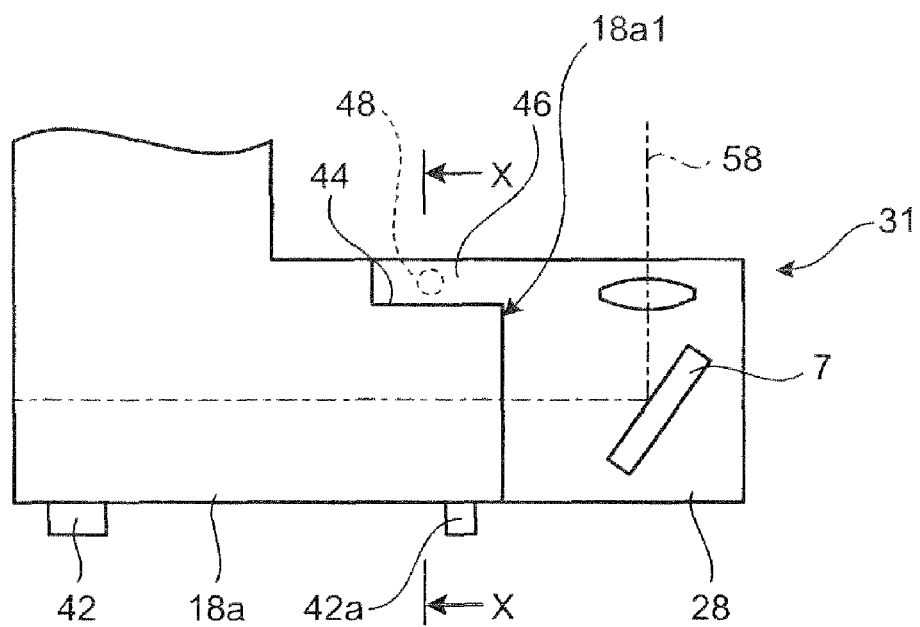
FIG. 17A is a schematic sectional side view showing a removable configuration of the microscope according to any of the second and third embodiments of the present invention.
Figure 17B:
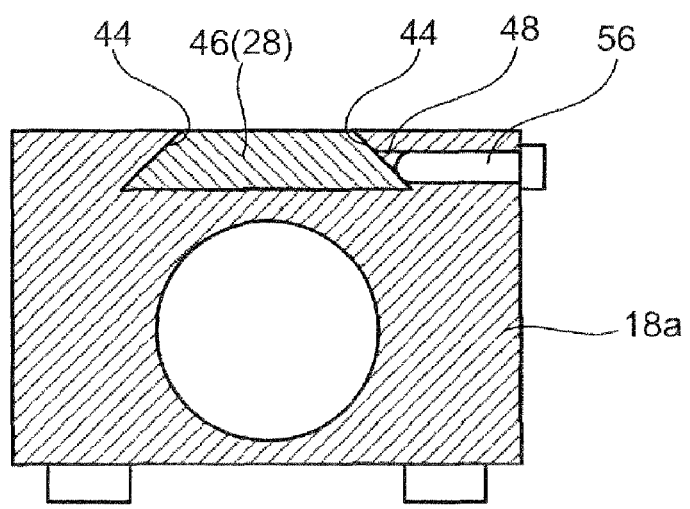
FIG. 17B is a cross-sectional view of the microscope taken along line X-X of FIG. 17A.

For example, as shown in FIGS. 17A and 17B, a case where the transmitted-light illumination unit 28 is removably mounted on the front side 31 of the base portion 18a is explained. A dovetail joint 46 formed on the upper side of a leading end of the transmitted-light illumination unit 28 is fitted into a dovetail groove 44 formed on the upper side of a front end of the base portion 18a, and the dovetail joint 46 is slid, so that the transmitted-light illumination unit 28 is removably mounted on the front side 31 of the base portion 18a. On the dovetail groove 44, one screw hole 48 is formed so as to penetrate through the dovetail groove 44. In this configuration, the transmitted-light illumination unit 28 is fitted into the dovetail groove 44, and an edge face of the transmitted-light illumination unit 28 is brought into contact with the butting side 18a1 of the base portion 18a. A fixation screw 56 is inserted into the screw hole 48 on the dovetail groove 44, and pressed against the dovetail joint 46 thereby fixing the dovetail joint 46. By this, the transmitted-light illumination unit 28 can be fixed on the base portion 18a. Furthermore, a rubber foot 42a is attached to the base portion 18a at a position just under the dovetail joint 46 on the front side of the bottom surface of the base portion 18a, so that even when a load is applied to the base or the like, the low-strength dovetail joint 46 is difficult to deform, and thus it is possible to prevent a decrease in illumination performance due to tilting of an optical axis 58 of the illumination. Just by tightening the screw 56, the transmitted-light illumination unit 28 can be automatically positioned from right to left or up and down by the dovetail groove 44 and the dovetail joint 46. Therefore, the transmitted-light illumination unit 28 can be fixed easily with high position reproducibility.

Figure 18A:
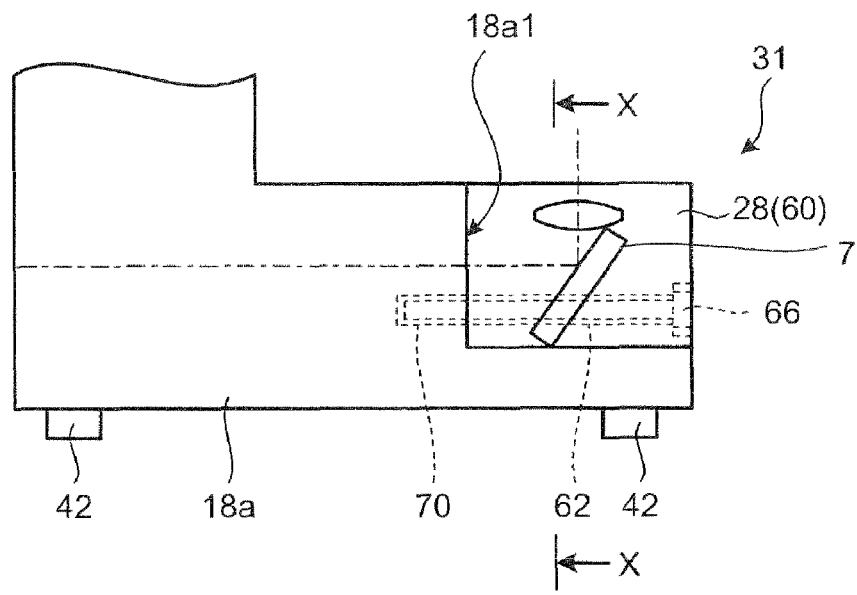
FIG. 18A is a schematic sectional side view showing another removable configuration of the microscope according to any of the second and third embodiments of the present invention.
Figure 18B:
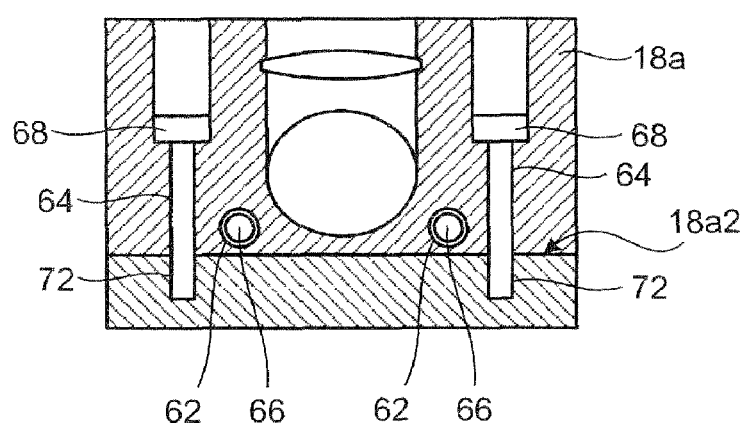
FIG. 18B is a cross-sectional view of the microscope taken along line X-X of FIG. 18A.

Furthermore, for example, as shown in FIGS. 18A and 18B, the transmitted-light illumination unit 28 can be removably mounted on the front side 31 of the base portion 18a. In this case, a notch 60 is formed on the upper side of the front end of the base portion 18a, and the transmitted-light illumination unit 28 is mounted on the notch 60. Two screw holes 62 horizontally-penetrating through the transmitted-light illumination unit 28 with respect to a front-back direction are formed on a lower part of the transmitted-light illumination unit 28. Two screw holes 64 vertically-penetrating through the transmitted-light illumination unit 28 with respect to the front-back direction are formed on both sides of the center of the transmitted-light illumination unit 28 in the front-back direction. In this configuration, the transmitted-light illumination unit 28 is arranged on the notch 60, and a leading end face and a lower end face of the transmitted-light illumination unit 28 are brought into contact with butting sides 18a1 and 18a2 of the base portion 18a, respectively. Then, fixation screws 66 are inserted into the screw holes 62, and driven in screw holes 70 on the base portion 18a, respectively. And, fixation screws 68 are inserted into the screw holes 64, and driven in screw holes 72 on the base portion 18a, respectively. By this, the transmitted-light illumination unit 28 can be fixed on the base portion 18a. This configuration makes possible to ensure the stiffness because of the abutting contact with the butting sides 18a1 and 18a2. Furthermore, the rubber feet 42 can be arranged on the front side of the bottom surface of the base portion 18a, so that it is possible to enhance the stability of tie microscope.

In the microscope 201 shown in FIG. 6, the transmitted-light illumination unit 28 includes the FS 6, the mirror 7, and the window lens 8. In the microscope 202 shown in FIG. 7, the transmitted-light illumination unit 28 further includes the filters 24 in addition to the FS 6, the mirror 7, and the window lens 8. In the microscope 203 shown in FIG. 8, the transmitted-light illumination unit 28 includes the FS 6, the window lens 8, the mirror 7, and the first lens group 9a.

The three types of the transmitted-light illumination units 28 shown in FIGS. 6 to 8 are interchangeable with one another. Incidentally, in the microscope 203 shown in FIG. 8, the configurations of the condenser lens 9, the stage holder 20, and the condenser holder 21 need to be modified in the same manner as the conventional example 4 (see FIG. 14).

In this manner, in the second embodiment, in addition to the same effect as the first embodiment, the transmitted light source and the transmitted-light illumination optical system are configured to be removable and replaceable with respect to one type of the main body 30 separately. Therefore, it is easy to configure an operation unit to be arranged on the surface of the main body 30. The operation unit includes an operation unit for operating opening and closing of the FS 6, an operation unit for operating insertion and removal of the filters 24, and the like. Depending on the makeup, the microscopes 201 to 203 according to the second embodiment may be produced at lower cost than the microscopes 101 to 105 according to the first embodiment.

Subsequently, microscopes 301 and 302 as examples of a microscope according to a third embodiment of the present invention are explained below with reference to FIGS. 9 and 10.

Figure 9:
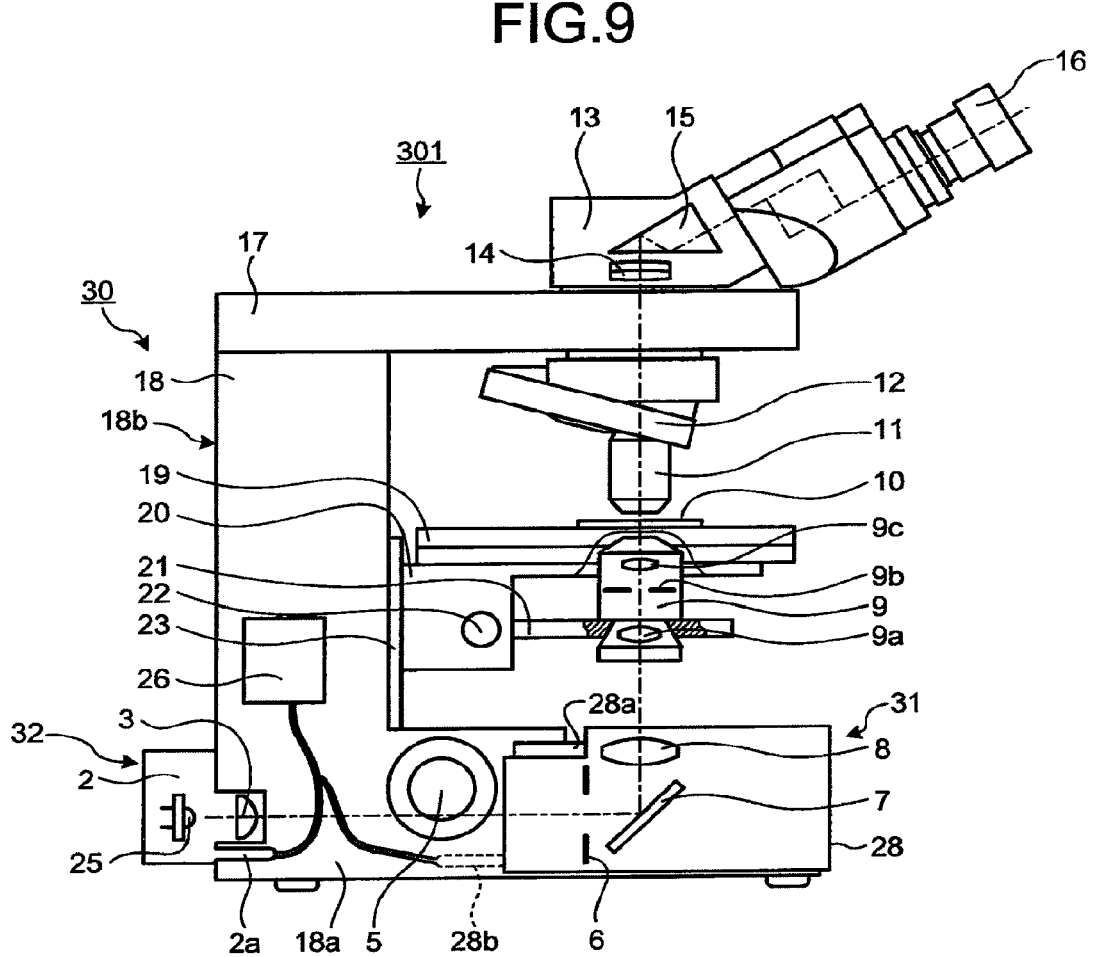
FIG. 9 is a schematic sectional side view of an example of a microscope according to a third embodiment of the present invention.
Figure 10:
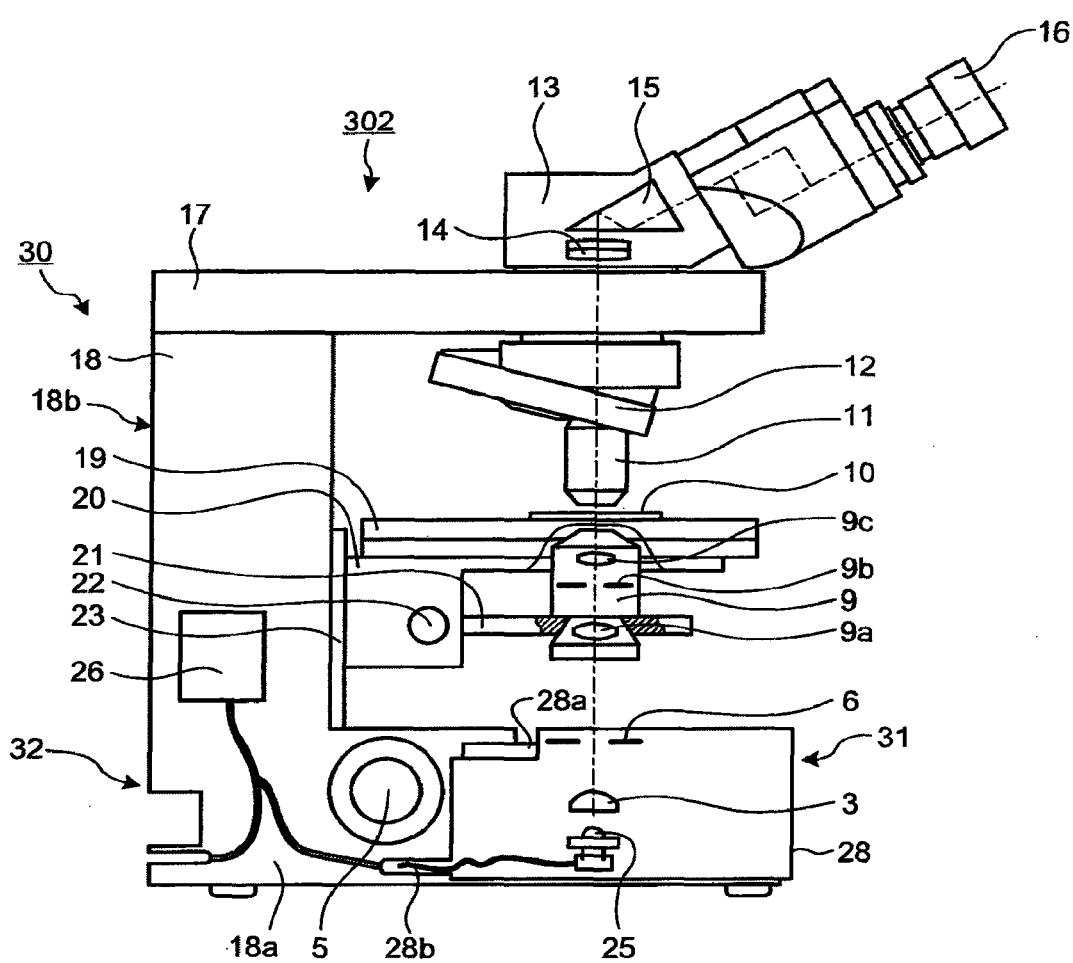
FIG. 10 is a schematic sectional side view of another example of the microscope according to the third embodiment of the present invention.
Figure 11:
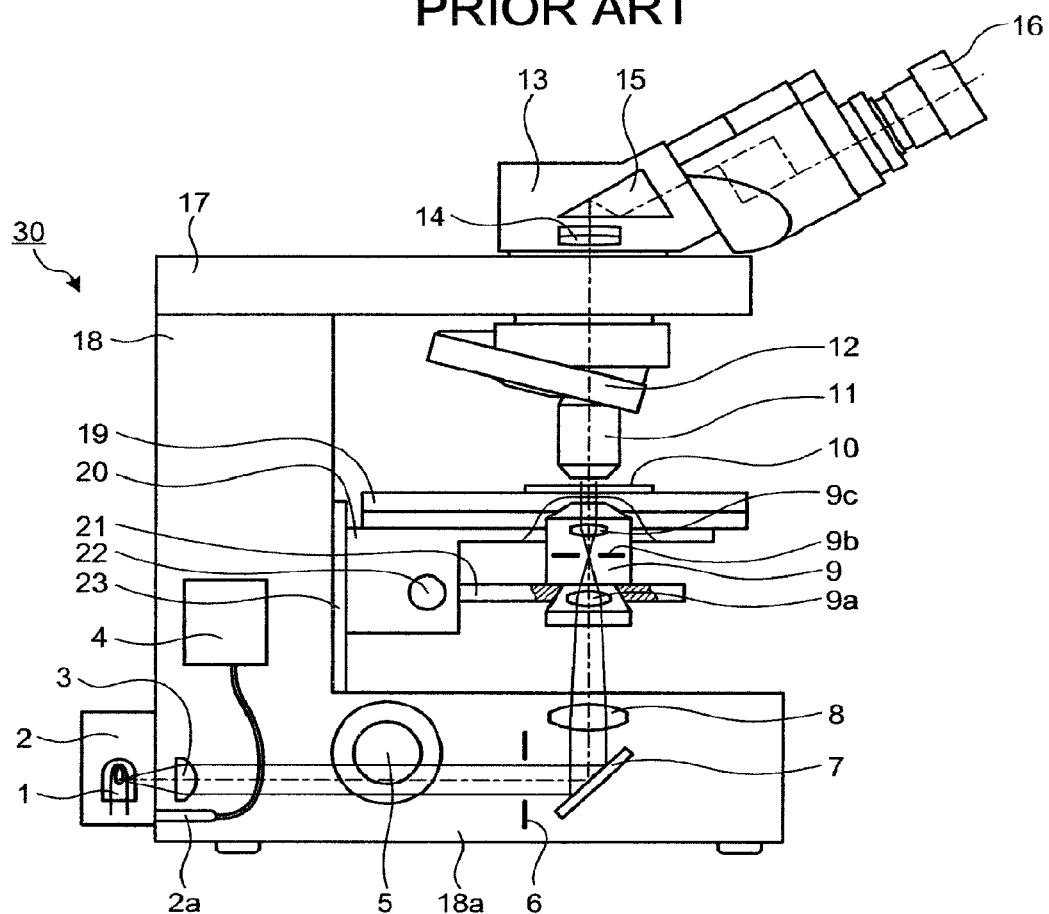
FIG. 11 is a schematic sectional side view of an example of a microscope according to a conventional example 1.
Figure 12:
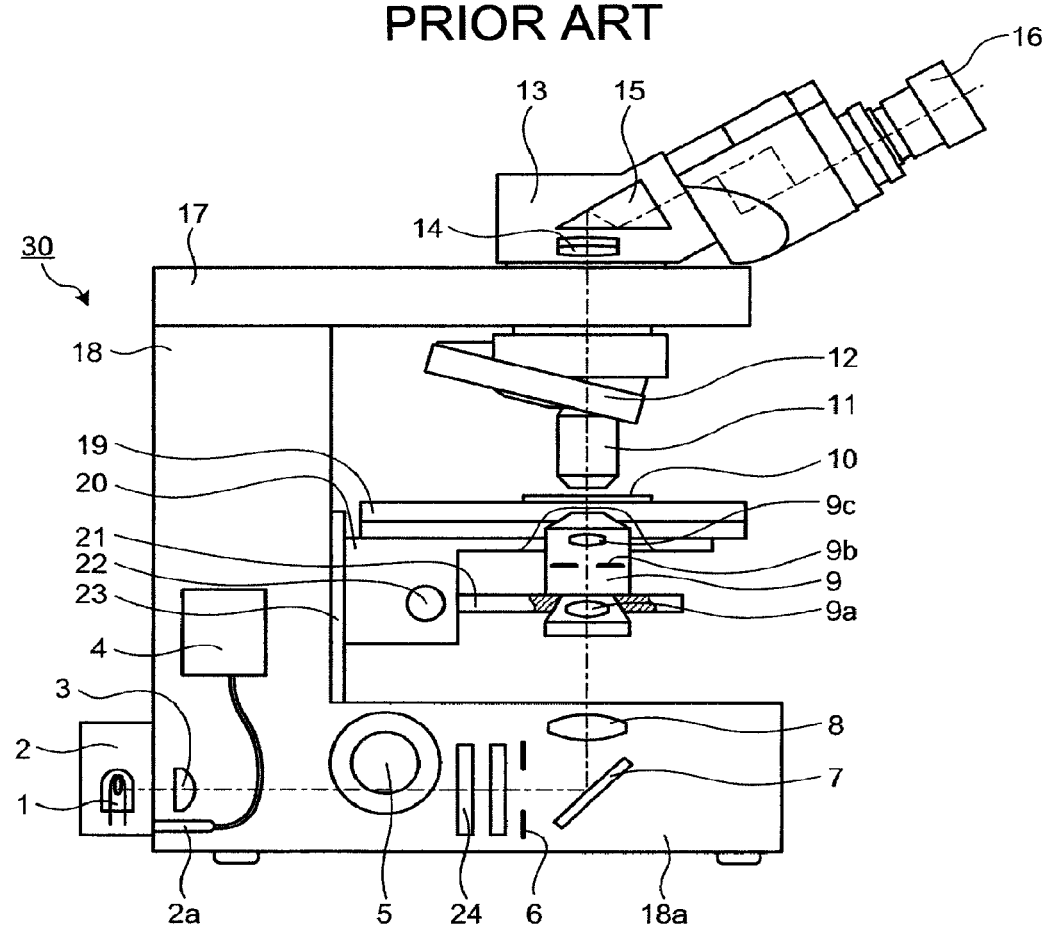
FIG. 12 is a schematic sectional side view of an example of a microscope according to a conventional example 2.
Figure 13:
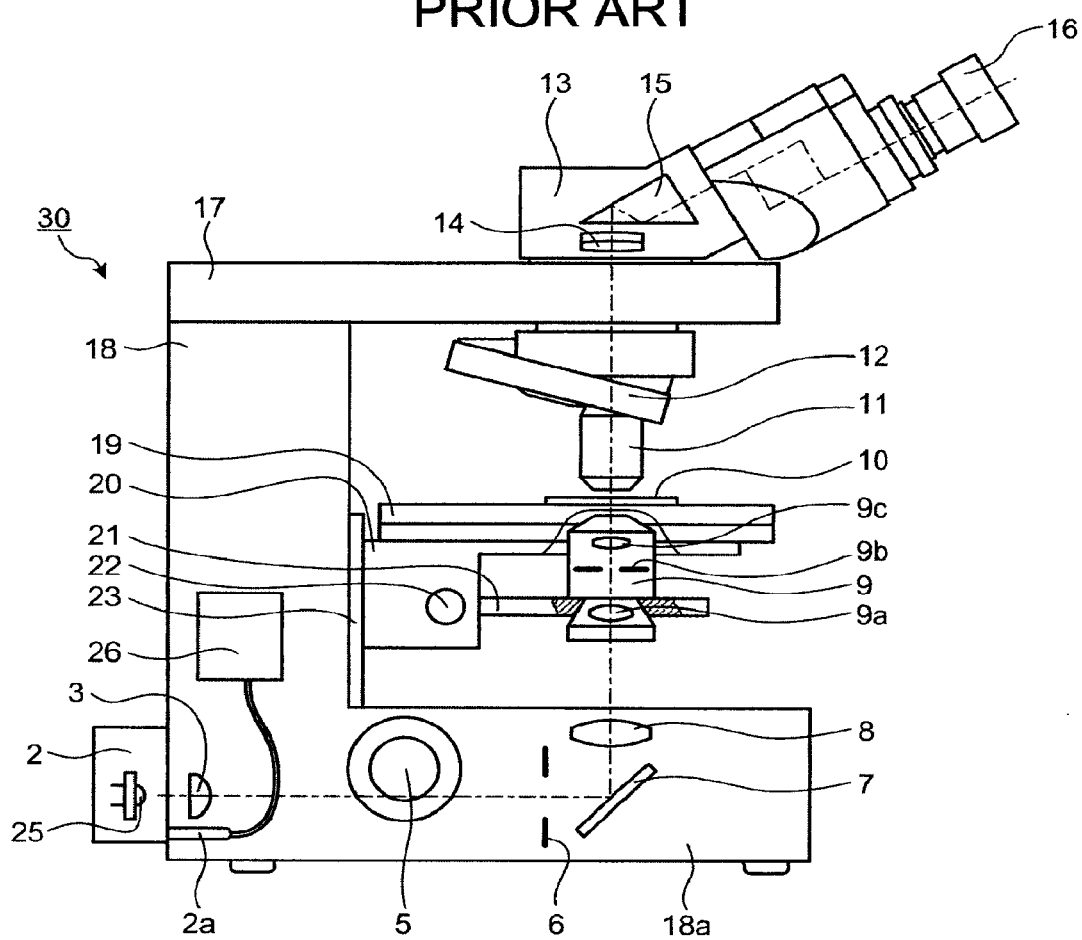
FIG. 13 is a schematic sectional side view of an example of a microscope according to a conventional example 3.
Figure 15:
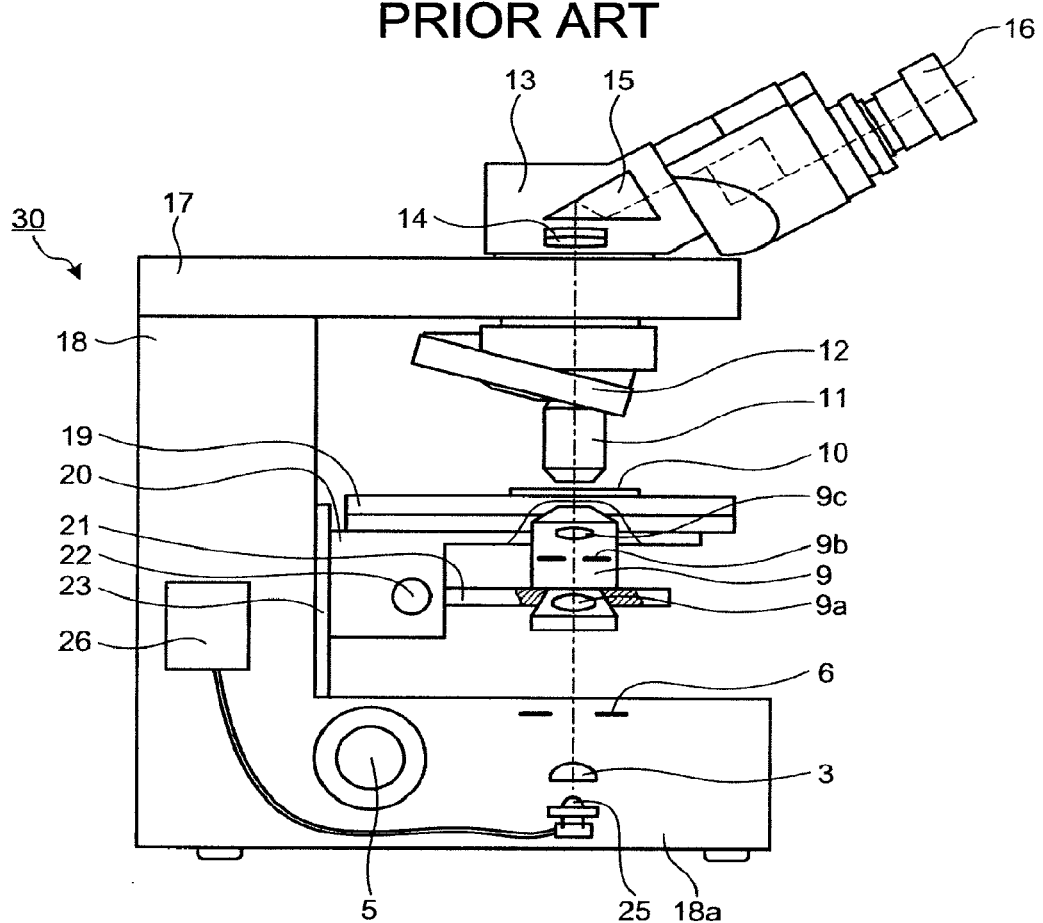
FIG. 15 is a schematic sectional side view of an example of a microscope according to a conventional example 5.

The microscope 301 shown in FIG. 9 is associated with the conventional example 3 (see FIG. 13), and the microscope 302 shown in FIG. 10 is associated with the conventional example 5 (see FIG. 15). The portions identical to those in the conventional examples 3 and 5 are denoted with the same reference numerals. Furthermore, the microscope according to the third embodiment includes the transmitted-light illumination unit 28 employed in the second embodiment, and the description of the transmitted-light illumination unit 28 is omitted.

As shown in FIGS. 9 and 10, in the microscopes 301 and 302 according the third embodiment, the transmitted-light illumination unit 28 as the transmitted-light illumination optical system is contained in the front side 31 of the base portion 18a of the frame 18. The transmitted-light illumination unit 28 is removably held on the frame 18 located on the near side with respect to an observer, i.e., on the front side 31 of the base portion 18a in an integrated manner. Specifically, as shown in FIGS. 9 to 10, the transmitted-light illumination unit 28 is removably held on the front side 31 of the base portion 18a by the means of the sliding dovetail 28a. Alternatively, the transmitted-light illumination unit 28 can be removably held on the front side 31 of the base portion 18a by a well-known means (not shown), for example, by three-sided butting and screw fixation, or fit with an anti-rotation pin and butting. Furthermore, for example, the configuration shown in FIGS. 17A and 17B or the configuration shown in FIGS. 18A and 18B as described above in the second embodiment can be used.

The power source 26 for the LED light source is non-removably contained in the frame 18, and connected to both the pin 2a for connecting the power source 26 electrically to the lamp house 2 and a pin 28b for connecting the power source 26 electrically to the transmitted-light illumination unit 28. Therefore, as shown in FIG. 10, when the transmitted-light illumination unit 28 including the light source is inserted into the base portion 18a via the sliding dovetail 28a, the LED light source 25 contained in the transmitted-light illumination unit 28 is electrically connected to the power source 26 for the LED light source via the pin 28b.

In this manner, in the third embodiment, in addition to the same effects as the first and second embodiments, either when the LED light source 25 is arranged on the rear side 32 of the base portion 18a or when the LED light source 25 is arranged right below the observation optical axis on the front side 31 of the base portion 18a, the power source 26 contained in the frame 18 can be used. Therefore, even when the transmitted-light illumination optical system is changed, it is economical because there is no need to replace the power source for the light source.

In the above third embodiment, the LED light source 25 is used as the light source. It is also possible to use the halogen light source 1 instead of the LED light source 25. Even when the halogen light source 1 is used as the light source, it is possible to achieve the same action and effect as the third embodiment.

The first to third embodiments of the present invention are explained above. In the first to third embodiments, the microscope using the transmitted-light illumination is described. However, the type of illumination is not limited to the transmitted-light illumination. The microscope according to the present invention can be applied to the one that does not use the transmitted-light illumination, for example, the one using only an epi-illumination without using the transmitted-light illumination. In this case, for example, the transmitted-light illumination unit and the lamp house are just removed from the main body of the microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   a main body that has a substantially C-shape in side view, and that comprises a lower horizontal portion, an upper horizontal portion, and a brace portion, the brace portion connecting between the lower horizontal portion and the upper horizontal portion at respective rear sides thereof;

a transmitted light source;

a collector lens that transforms the illumination light from the transmitted light source into substantially parallel light; and a transmitted-light illumination optical system that brings illumination light from the transmitted light source to a specimen supported by the main body, and illuminates the specimen with the illumination light transmitted therethrough, wherein the lower horizontal portion and the brace portion are integrated to form an L-shape frame, wherein the transmitted-light illumination optical system and the transmitted light source are removably attachable to the frame of the main body, wherein the transmitted-light illumination optical system includes:

a field stop that restricts the illumination light transmitted through the collector lens;

a mirror that deflects an optical path of the illumination light passing through the field stop; and a window lens that projects a field stop image from the mirror on substantially infinity, wherein at least the transmitted light source and the collector lens are removably attachable to a rear side of the frame in an integrated manner, and wherein at least the field stop, the mirror, and the window lens are removably attachable to a front side of the frame in an integrated manner.

2. The microscope according to claim 1, wherein at least one of the transmitted-light illumination optical system and the transmitted light source can be selected from among multiple types of transmitted-light illumination optical systems and transmitted light sources, and wherein the frame is configured to removably mount thereon the transmitted-light illumination optical system and the transmitted light source interchangeably.

3. The microscope according to claim 2, wherein the transmitted-light illumination optical system can be selected from a first transmitted-light illumination optical system and a second transmitted-light illumination optical system, the first transmitted-light illumination optical system including at least one of a color conversion filter and a neutral density filter, and the second transmitted-light illumination optical system including no color conversion filter and no neutral density filter, and wherein the first transmitted-light illumination optical system and the second transmitted-light illumination optical system are interchangeably removably attachable to the frame.

4. The microscope according to claim 2, wherein the transmitted light source can be selected from a halogen light source and a light-emitting diode light source, and the halogen light source and the light-emitting diode light source are interchangeably removably attachable to the frame.

5. The microscope according to claim 1, wherein the transmitted-light illumination optical system further includes a color conversion filter and a neutral density filter, and wherein the field stop, the mirror, the window lens, and at least one of the color conversion filter and the neutral density filter are removably attachable to the front side of the frame in an integrated manner.

6. The microscope according to claim 1, further comprising a condenser lens that brings the illumination light from the transmitted light source to the specimen, and includes a first lens group, an aperture stop, and a second lens group, wherein the first lens group is contained in the transmitted-light illumination optical system that is removably attachable to the front side of the frame in the integrated manner.

7. The microscope according to claim 1, further comprising a power source which powers the transmitted light source, the power source being removably attachable to the main body.

* * * * *